(12) United States Patent
Gupta

(10) Patent No.: US 6,288,592 B1
(45) Date of Patent: *Sep. 11, 2001

(54) CABLE DRIVER WITH CONTROLLED LINEAR RISE AND FALL

(75) Inventor: Atul Krishna Gupta, Burlington (CA)

(73) Assignee: Gennum Corporation, Burlington (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,194

(22) Filed: Jan. 21, 1998

(51) Int. Cl.[7] .................... H03K 17/28; H03K 17/296
(52) U.S. Cl. ............................... 327/392; 327/400
(58) Field of Search ....................... 327/108, 112, 327/133, 170, 172, 261, 263, 269, 270, 271, 272, 284, 392, 393, 394, 395, 396, 399, 400, 401; 326/26, 30, 31, 38, 82

(56) References Cited

U.S. PATENT DOCUMENTS 5,107,257 * 4/1992 Fukuda ..................... 340/825.08
5,355,390 * 10/1994 Yamamoto et al. ................ 375/36
5,446,914 * 8/1995 Paul et al. ........................ 395/800
5,739,707 * 4/1998 Barraclough .................... 327/112

FOREIGN PATENT DOCUMENTS

| 0 518 625 A2 | 12/1992 | (EP) . |
| 0 607 677 A2 | 7/1994 | (EP) . |
| 0 664 515 A1 | 7/1995 | (EP) . |
| 0 763 917 A2 | 3/1997 | (EP) . |
| WO 92/17938 | 10/1992 | (WO) . |
| WO 95/02926 | 1/1995 | (WO) . |

* cited by examiner

Primary Examiner—My-Trang Nu Ton
(74) Attorney, Agent, or Firm—Bereskin & Parr

(57) ABSTRACT

A cable driver is disclosed which provides a substantially linear output signal corresponding to an input signal received by the cable driver on a transmission line. The cable driver includes a number of switches coupled by delay elements with cause the switches to operate in a sequential order in response to an input signal. Each of the switches couples an associated current source to an output port, producing a substantially linear output signal on a transmission line connected to the output port. The substantially linearity of the output signal increases the rate at which data may be transmitted over the transmission line, while permitting the rise and fall time of a specified portion of the output signal to be controlled to ensure that electro-magnetic interference is not produced.

14 Claims, 8 Drawing Sheets

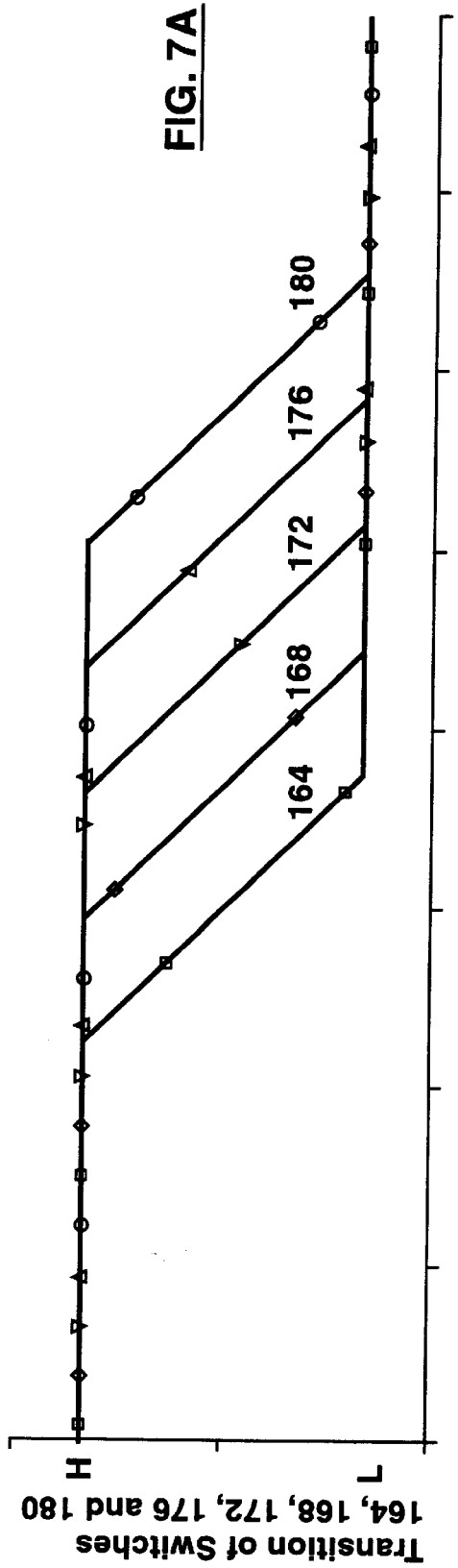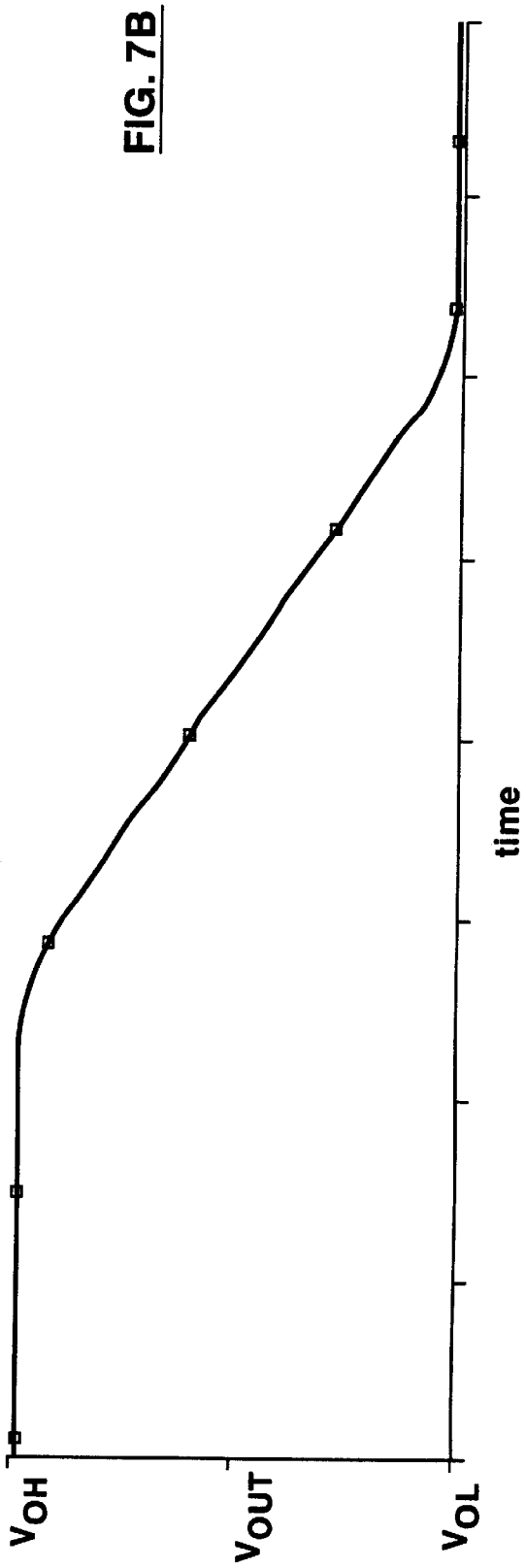

CABLE DRIVER WITH CONTROLLED LINEAR RISE AND FALL

FIELD OF THE INVENTION

This invention relates to the field of data communications. More particularly, the invention relates to cable drivers, line drivers, wave shaping of digital pulses and rise and fall control circuits.

BACKGROUND OF THE INVENTION

The transmission of digital data along a transmission line may be accomplished using a cable driver. The cable driver receives the signal to be transmitted and generates a corresponding signal on the transmission line. One objective in the design of cable drivers is to maximize the rate at which data may be transmitted (the "data rate") on the transmission line. Among other limitations, the maximum data rate which may be transmitted will be limited by two considerations:

i. The cable driver should not generate excessive electromagnetic radiation, which may affect the operation of other devices near the cable driver. To avoid electromagnetic radiation, the 20% to 80% rise and fall time of the low to high and high to low transitions of the output signal of the cable driver must not be less than a specified minimum rise/fall time. In the case of some cable drivers used in the motion picture and television industries, the Society of Motion Picture and Television Engineering (SMPTE) has set out a minimum rise/fall time of 400 pico-seconds (See SMPTE Standard 259M: 10-Bit 4:2:2 Component and $f_{SC}$ Composite Digital Signal Serial Digital Interface).

ii. The cable driver should minimize any jitter in its output signal by ensuring that the output signal is within a specified tolerance of its steady state level prior to the start of the next transition of the output signal.

Prior art cable drivers control the rise and fall times of the output signal with a resistor-capacitor circuit. Such circuits exhibit exponential low to high and high to low output transitions with the result that the output signal takes a relatively long time to settle within the specified tolerance to minimize jitter, while still having a sufficiently long 20% to 80% rise and fall time. Consequently, the data rate which can be transmitted by prior art cable drivers is limited.

BRIEF SUMMARY OF THE PRESENT INVENTION

The maximum data rate which can be transmitted may be increased by designing the cable driver to have linear low to high and high to low output transitions.

Accordingly, it is an objective of the present invention to provide an improved cable driver which has substantially linear low to high and high to low output transitions.

The primary feature of the improved cable driver is the ability to transmit data at higher data rates without increased jitter or electromagnetic radiation. In addition, the improved cable driver reduces the problems of ringing and overshoot in the output signal.

In one aspect, the improved cable driver comprises (a) an input port for receiving an input signal, comprising first and second input terminals; (b) an output port for transmitting an output signal on a transmission line, comprising first and second output terminals; (c) a first resistance and a second resistance for defining an output signal at said output port, said first resistance being coupled between a voltage source and said first output terminal and said second resistance being coupled between said voltage source and said second output terminal; (d) a plurality of switching stages, wherein each of said switching stages comprises a switch and a current source associated with said switch for producing a current, said current source being coupled to its associated switch and each of said switches being coupled to said output port; (e) a plurality of delay stages for providing a delay time, (f) one of said switching stages being coupled to said input port and the remaining switching stages being coupled in series, with a delay stage between at least some of successive pairs of said switching stages so that the rise and fall times of a selected portion of said output signal exceeds a selected duration.

In a second aspect, the improved cable driver comprises (a) an input port for receiving an input signal, comprising first and second input terminals; (b) an output port for transmitting an output signal on a transmission line, comprising first and second output terminals; (c) a first resistor and a second resistor for defining an output signal at said output terminal, said first resistor being coupled between a first voltage source and said first output terminal, and said second resistor being coupled between the first voltage source and said second output terminal, wherein the resistances of said first resistor and said second resistor are equal to the impedance of the transmission line; (d) a plurality of switching stages, wherein each of said switching stages comprises a switch and a current source associated with said switch for producing a current, said current source being coupled between its associated switch and a second voltage source, and each of said switches being coupled to said input port and being responsive to said input signal for coupling its associated current source to said first output terminal or said second output terminal and being capable of switching between said first output terminal and second output terminal with a specified switching time and wherein the switching time of each of said switches is equal; (e) a plurality of delay stages, such that the number of delay stages is one less than the number of switching stages, for providing a delay time, wherein each of said delay stages is coupled between a pair of said switches of said switching stages, for delaying the response of said switches to said input signal such that said switches operate in a sequential order and wherein the delay time of each of said delay stages is equal, and the delay time of said delay stages and the switching time of said switches are selected such that the output signal is substantially linear.

BRIEF DESCRIPTION OF THE DRAWINGS

FIGS. 6A & 6B and 7A & 7B show the transition of switches which comprise the improved cable driver the output signal of the improved cable driver.

DETAILED DESCRIPTION OF THE PREFERRED EMBODIMENT

Figure 1:
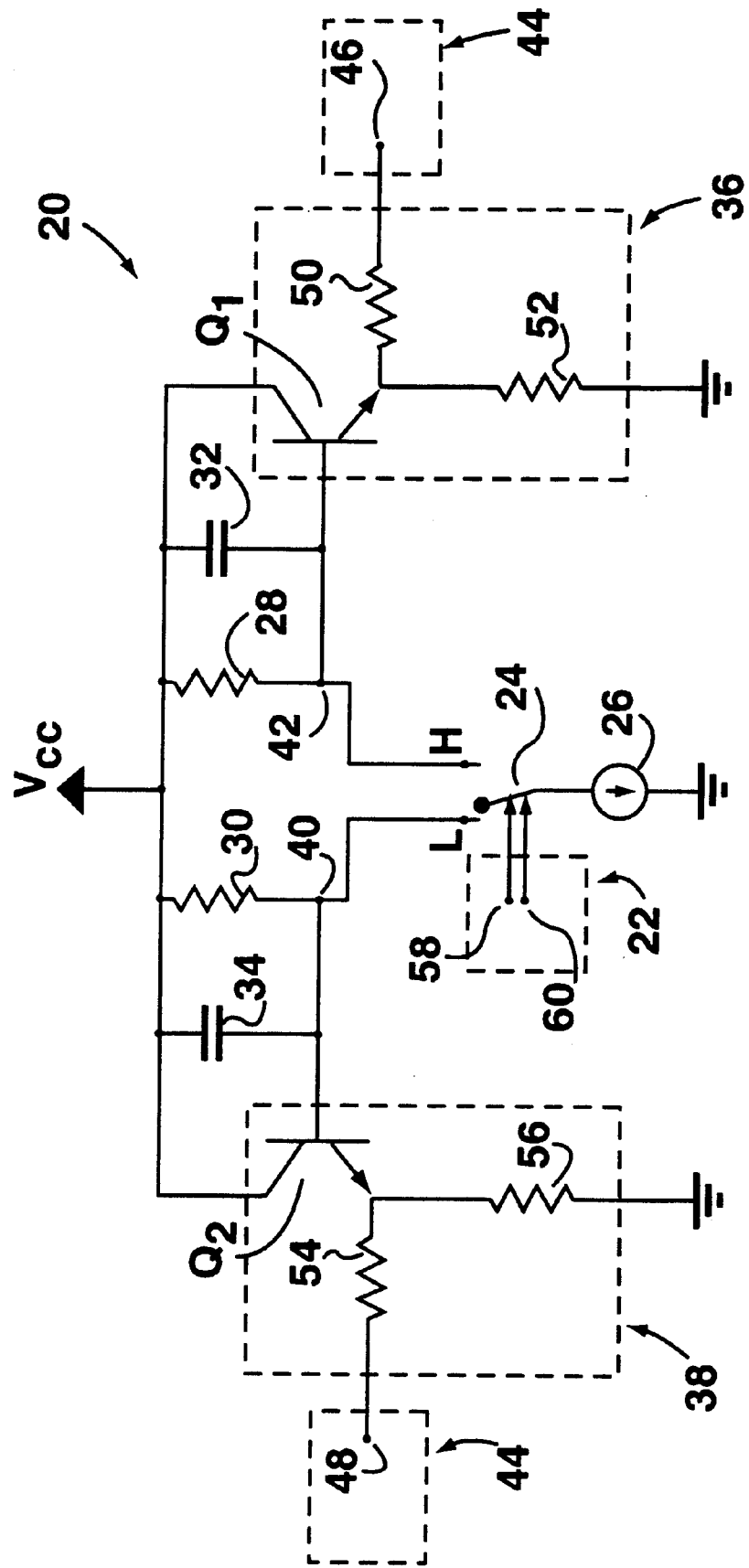
FIG. 1 shows a prior art cable driver.

Reference is first made to FIG. 1, which shows a prior art cable driver 20 for transmitting a digital signal over a transmission line. The prior art cable driver 20 comprises an input port 22, a switch 24, a current source 26, resistors 28 and 30, capacitors 32 and 34, output stages 36 and 38 and an output port 44.

Capacitor 32 and resistor 28 are connected in parallel between $V_{CC}$ and node 42. Capacitor 34 and resistor 30 are connected in parallel between $V_{CC}$ and node 40. Current source 26 is coupled between switch 24 and ground. Switch 24 is responsive to an input received at input port 22 and may couple current source 26 to node 42 through node H or to node 40 through node L. Output port 44 comprises output terminals 46 and 48.

Output stage 36 comprises transistor $Q_1$, and resistors 50 and 52. Transistor $Q_1$ is connected as an emitter follower stage. The base of transistor $Q_1$ is connected to node 42. The emitter of transistor $Q_1$ is coupled to ground through resistor 52 and to output terminal 46 through resistor 50. The collector of transistor $Q_1$ is coupled to $V_{CC}$. Output stage 38 is similarly comprised of a transistor $Q_2$ and two resistors 54 and 56. The base of transistor $Q_2$ is connected to node 40. The emitter of transistor $Q_2$ is coupled to ground through resistor 56 and to output terminal 48 through resistor 54. The collector of transistor $Q_2$ is connected to $V_{CC}$.

In use, the prior art cable driver 20 will be configured to produce a differential output signal $V_{out}$ at output terminals 46 and 48. The differential output signal is defined as the difference between the voltage at output terminal 48 ($V_{48}$) and the voltage at output terminal 46 ($V_{46}$):

$$V_{out} = V_{48} - V_{46}.$$

The differential output signal $V_{out}$ will be positive when $V_{48}$ is higher than $V_{46}$ and this condition will be referred to as a high output signal. Conversely, the differential output signal $V_{out}$ will be negative when $V_{48}$ is lower than $V_{46}$ and this condition will be referred to as a low output signal. Although the description here is given with respect to a differential output signal, one skilled in the art will recognize that the individual components of the output signal $V_{out}$ at terminals 46 and 48 may be used independently, for example, to drive a single ended cable.

The prior art cable driver 20 operates as follows. A differential input signal, $V_{in}$, is received at input port 22, which comprises input terminals 58 and 60, and is directed to switch 24. The differential input signal consists of two voltage signals, one of which is received at terminal 58 and the other of which is received at terminal 60. $V_{in}$ is defined as the voltage at terminal 60 ($V_{60}$) minus the voltage at terminal 58 ($V_{58}$):

$$V_{in} = V_{60} - V_{58}.$$

$V_{in}$ will be positive when $V_{60}$ is higher than $V_{58}$ (defined as $V_{in} = V_{IH}$). This condition will be referred to as a high input signal. Conversely $V_{in}$ will be negative when $V_{60}$ is lower than $V_{58}$ (defined as $V_{in} = V_{IL}$) and this condition will be referred to as a low input signal.

Switch 24 is responsive to the differential input signal $V_{in}$ and switches between nodes L and H depending on whether differential input signal $V_{in}$ is low or high, respectively. When differential input signal $V_{in}$ is high, switch 24 will connect current source 26 to node H and conversely, when differential input signal $V_{in}$ is low, switch 24 will connect current source 26 to node L.

Assuming that differential input signal $V_{in}$ is initially low, switch 24 will couple current source 26, which has a current $I_{26}$, to node 40. Current $I_{26}$ will flow through resistor 30, which has a resistance $R_{30}$, and capacitor 34. Capacitor 34 will be charged and the voltage at node 40 will fall to $V_{CC} - V_{34}$, where $V_{34}$ is the voltage across capacitor 34. Capacitor 34 will charge until the voltage at node 40 falls to $V_{CC} - I_{26} R_{30}$. The voltage at output terminal 48 will be $V_{CC} - I_{26} R_{30} - V_{BE2}$, where $V_{BE2}$ is the base-emitter voltage of transistor $Q_2$.

Simultaneously, any charge on capacitor 32 will be discharged through resistor 28, which has a resistance $R_{28}$. When capacitor 32 is fully discharged, the voltage at node 42 will be $V_{CC}$ and the voltage at output terminal 46 will be $V_{CC} - V_{BE1}$, where $V_{BE1}$ is the base emitter voltage of transistor $Q_1$. Assuming that the base-emitter voltages of transistors $Q_1$ and $Q_2$ are the same and are equal to $V_{BE}$ (i.e. $V_{BE1} = V_{BE2} = V_{BE}$), the low value of the differential output signal $V_{out}$ will be $$V_{OL} = V_{48} - V_{46}$$
$$= (V_{CC} - I_{26} R_{30} - V_{BE}) - (V_{CC} - V_{BE})$$
$$= -I_{26} R_{30}$$

When the differential input switches from low to high, switch 24 will couple current source 26 to node 42. Current $I_{26}$ will now flow through resistor 28 and capacitor 32, which was previously discharged. Capacitor 32 will charge and the voltage at output terminal 46 will fall to $V_{CC} - I_{26} R_{28} - V_{BE}$. Simultaneously, capacitor 34, which was previously charged will discharge through resistor 30 and the voltage at output terminal 48 will rise to $V_{CC} - V_{BE}$. The high value of the differential output signal $V_{out}$ will thus be $$V_{OH} = V_{48} - V_{46}$$
$$= (V_{CC} - V_{BE}) - (V_{CC} - I_{26} R_{28} - V_{BE})$$
$$= I_{26} R_{28}$$

When the differential input switches from high to low, the process described above will occur in reverse and the differential output signal will return to its initial value of $-I_{26} R_{30}$.

The specific output voltage levels will depend on the magnitude of current of current $I_{26}$ and the resistances $R_{28}$ and $R_{30}$. If both resistors have the same value (as they generally will), the differential output voltage swing will be $2I_{26}R$, where R is the resistance of resistors 28 and 30.

One skilled in the art will understand that emitter follower output stages 36 and 38 are required to match the output impedance of the transmission line to which the cable driver's output is directed. The impedance of a transmission line is generally resistive with very low reactance. The resistance of resistors 50 and 54 will normally be equal to the resistance of the transmission line. The use of the emitter follower output stages 36 and 38 introduces a potential problem of ringing and overshoot in the differential output signal appearing at output port 44. The cable driver 20 will normally be integrated onto a single chip with a package. Emitter follower stages are typically inductive and combined with the parasitic capacitance of the cable driver's package, the output stage 36 or 38 may introduce resonance into the output. If this resonance is substantial, the overshoot and ringing introduced into the transmission line may exceed acceptable tolerances, depending on the particular installation of the prior art cable driver 20.

Figures 2A, 2B:
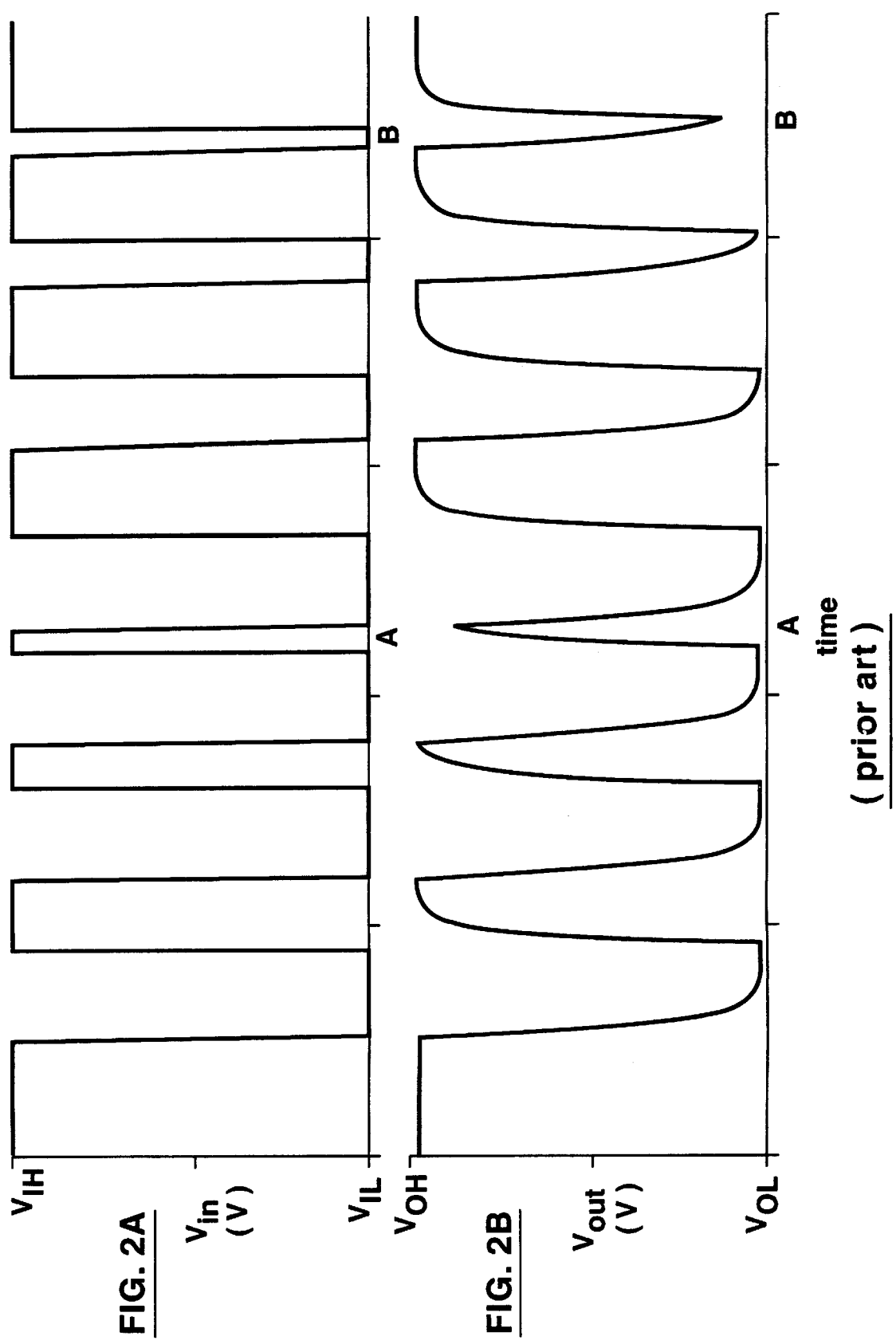
FIGS. 2A & 2B show the input and output signals of the prior art cable driver.

Reference is now made to FIGS. 2A and 2B, which shows the input and output voltages of the prior art cable driver 20, respectively. FIG. 2A shows differential input signal $V_{in}$ received at input port 22 and FIG. 2B shows the differential output signal $V_{out}$ generated by the prior art cable driver 20 at output port 32 in response to the differential input signal $V_{in}$.

As shown, the differential output signal $V_{out}$ rises and falls exponentially due to the presence of capacitors 32 and 34 in the prior art cable driver 20. One skilled in the art will recognize that these capacitors in fact increase the rise and fall times of the differential output signal $V_{out}$. However, these capacitors are required to ensure that the 20% to 80% rise and fall times are not less than the specified minimum time, and therefore ensure that electromagnetic radiation is not produced in the prior art cable device driver. The exponential rise and fall curve of the differential output signal limits the maximum bandwidth of the prior art cable driver 20, as will be explained below.

As shown at point A on FIGS. 2A and 2B, when the differential input signal $V_{in}$ does not remain high for a sufficiently long period, the differential output signal $V_{out}$ does not approach its maximum output level. When the differential input signal $V_{in}$ subsequently steps from high to low, the differential output signal begins to fall. The starting voltage level for the high to low transition of the output signal is lower than in the normal case, introducing pattern jitter into the differential output signal $V_{out}$. The same effect is seen at point B when the differential input signal $V_{in}$ has a short low input pulse.

Figure 3A:
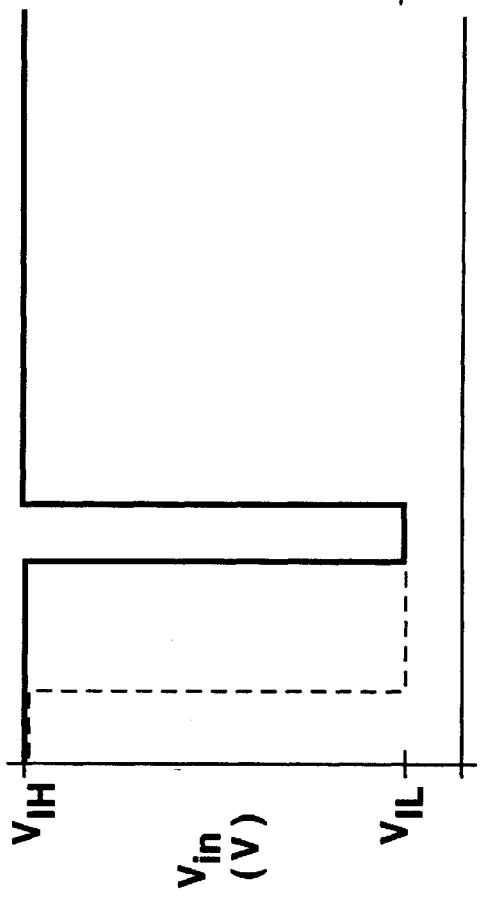
FIGS. 3A & 3B show the jitter introduced into the output signal when the prior art cable driver receives a short input pulse.
Figure 3B:
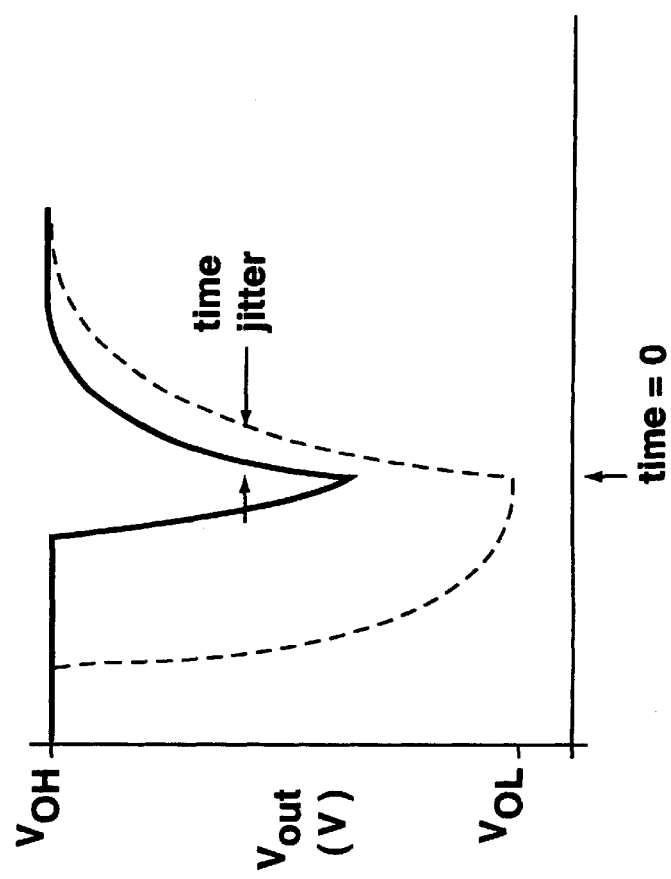

Reference is next made to FIGS. 3A and 3B which show the effect of this pattern jitter more clearly, in the case of a short low input pulse. The dashed line in FIG. 3A shows a normal low input pulse in the differential input signal $V_{in}$. The dashed line in FIG. 3B shows the corresponding differential output signal $V_{out}$. Sufficient time has elapsed by the end of the normal low input pulse to permit the differential output signal $V_{out}$ to reach its normal low level $V_{OL}$. The solid line in FIG. 3B shows the differential output signal $V_{out}$ when the differential input signal $V_{in}$ has a short low input pulse, shown by the solid line in FIG. 3A, and the low to high transition occurs before the differential output signal $V_{out}$ reaches $V_{OL}$. In FIG. 3B, the difference between the dashed and solid lines is time jitter, as shown.

The degree of jitter may be calculated as follows. If the time at which the low pulse of the differential input signal $V_{in}$ ends is time 0, then the voltage of the output differential signal $V_{out}$, in the normal case (dashed lines), may be written $$V_{out} = V_{OH} - (V_{OH} - V_{OL})e^{\frac{-t}{R_{28}C_{32}}},$$

where $C_{32}$ is the capacitance of capacitor 32 and t is time in seconds. To simplify the calculation of jitter, we make the following exemplary definitions:
$V_{OH}$=1 volt
$V_{OL}$=0 volts
$R_{28}$=R
$C_{32}$=C Once skilled in the art will be capable of selecting appropriate components for the prior art cable driver 20 to produce these $V_{OH}$ and $V_{OL}$ voltages.

Thus, $V_{out}$ may be written $$V_{out} = 1 - e^{\frac{-t}{RC}}.$$

The time at which $V_{out}$ reaches any particular voltage Va may be written $$t = -RC\ \ln(1-Va)$$

Thus, the time $t_o$ at which $V_{out}$ reaches a voltage of 0.5V is $$t_o = -RC\ \ln(0.5)$$

If the low to high transition of the input differential signal occurs when the differential output signal has a value of 0.02V (within 2% of its steady state value of 0V), $V_{out}$ may be written $$V_{out} = 1 - 0.98e^{\frac{-t}{RC}}.$$

and the time at which $V_{out}$ reaches any particular voltage Va may be written $$t = -RC\ \ln((1-Va)/0.98).$$

The time at which the differential output voltage $V_{out}$ reaches a voltage of 0.5V is $$t_1 = -RC\ \ln(0.5/0.98)$$

The time jitter introduced by the 2% error may then be calculated as $$Jitter = t_0 - t_1$$
$$= -RC\ \ln(0.98)$$

The 20% to 80% rise time of the differential output signal $V_{out}$ may be written $$t_{20-80} = t_{80\%} - t_{20\%}$$
$$= -RC\ \ln(0.2) - (-RC\ \ln(0.8))$$
$$= -RC\ \ln(0.2/0.8)$$
$$= -RC\ \ln(0.25)$$

The percentage effect of jitter resulting from a low to high transition which occurs when the output signal is settled to within 2% of it steady state value may be calculated as $$\%\ Jitter = Jitter/t_{20-80}$$
$$= [-RC\ \ln(0.98)]/[-RC\ \ln(0.25)]$$
$$= 1.46\%$$

This indicates that if the differential output voltage $V_{out}$ does not settle to within 2% of its steady state value, a jitter of greater than 1.46% of the rise and fall time results. One skilled in the art will be able to show that this calculation holds true for an early high to low transition and for any arbitrary high and low voltage levels ($V_{OH}$ and $V_{OL}$) for the differential output signal $V_{out}$.

Figure 4:
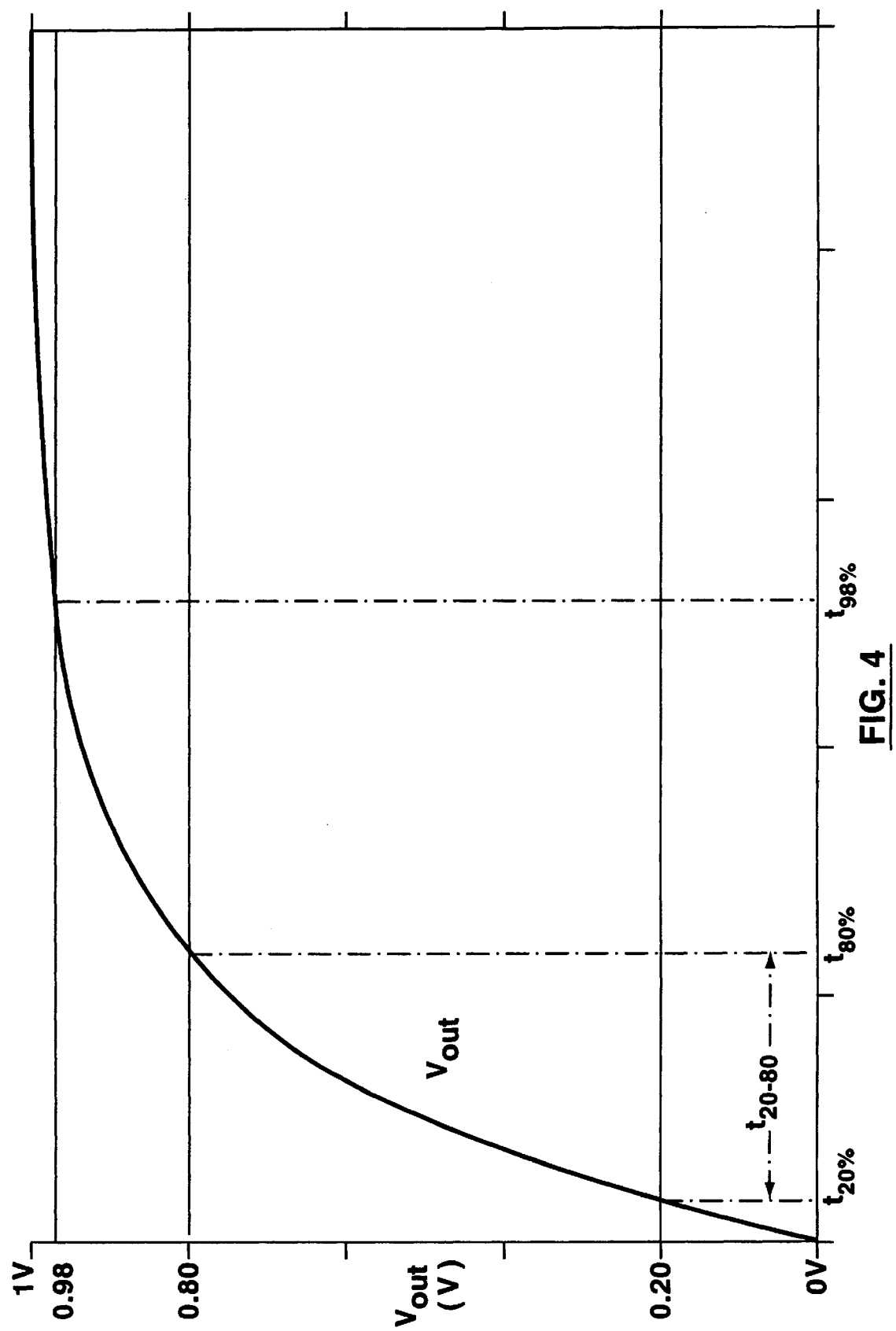
FIG. 4 shows a low to high transition of the output signal of the prior art cable driver.

Reference is next made to FIG. 4, which shows the differential output signal $V_{out}$, the 20% to 80% rise time of the differential output signal $V_{out}$ for the prior art cable driver 20 (shown in FIG. 1) and the 2% settling time (i.e. the 98% rise time, $t_{98\%}$) of the differential output signal $V_{out}$. Since the 20% to 80% rise time of the cable driver must exceed the specified minimum threshold, the maximum data rate which may be transmitted using the prior art cable driver 20 will be dependent on the ratio of the 20% to 80% rise time to the 2% settling time of the differential output signal $V_{out}$.

The ratio of the 20% to 80% rise time of the differential output signal $V_{out}$ to the 2% settling time of the differential output signal $V_{out}$ may be calculated $$t_{20-80}/t_{98\%} = [-RC\ \ln(.25)]/[-RC\ \ln(0.02)]$$
$$= 35.4\%$$

If this ratio could be increased, the maximum data rate which may be transmitted on a transmission line could also be increased, without introducing any additional electromagnetic radiation and without increasing jitter.

Figure 5:
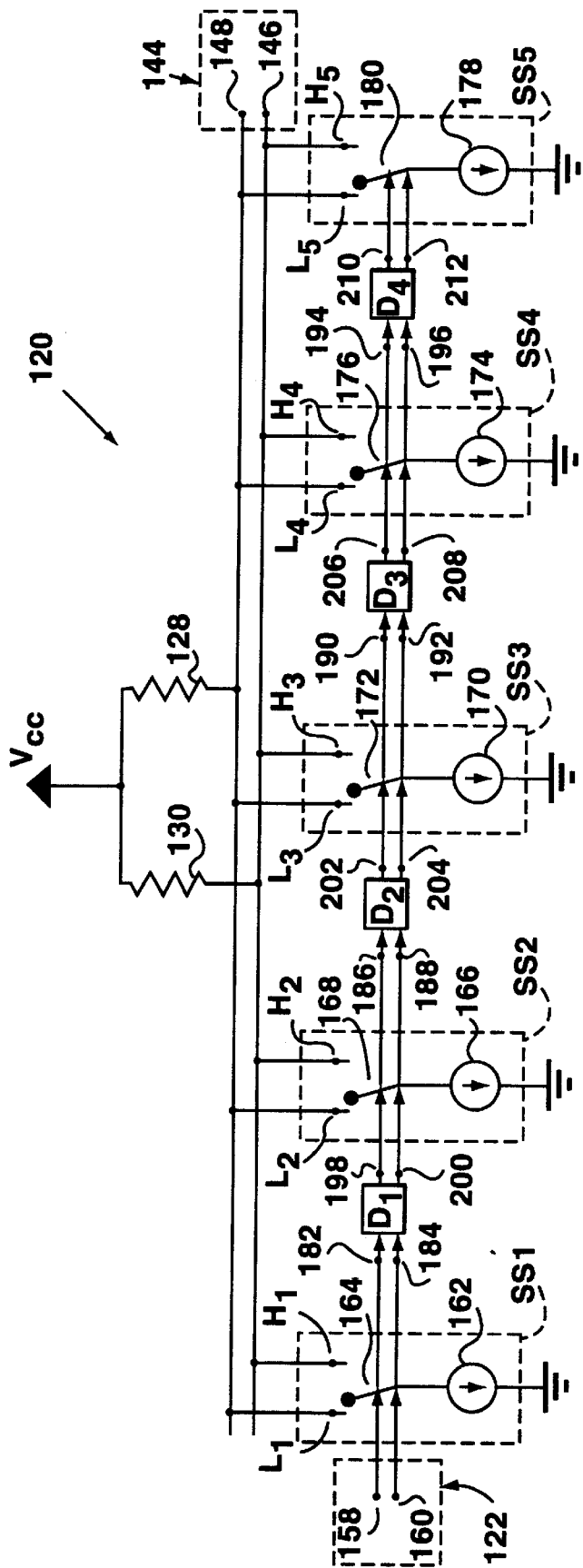
FIG. 5 shows the improved cable driver in block diagram form.

Reference is next made to FIG. 5, which shows an improved cable driver 120, according to the present invention.

The improved cable driver 120 comprises an input port 122, an output port 144, two resistors 128 and 130 and five switching stages SS1, SS2, SS3, SS4 and SS5 coupled in series by four delay stages, D1, D2, D3 and D4.

Input port 122 comprises input terminals 158 and 160. Output port 144 comprises output terminals 146 and 148. Resistor 128, which has resistance $R_{128}$, is coupled between $V_{CC}$ and node 148 and resistor 130, which has resistance $R_{130}$, is coupled between $V_{CC}$ and node 146.

Resistors 128 and 130 will be chosen to match the impedance of the transmission line to which the improved cable driver 120 is coupled. This eliminates the need for emitter follower output stages, so the associated problems of ringing and overshoot are avoided.

Switching stage SS1 comprises a current source 162 and a switch 164. Current source 162 is coupled between switch 164 and ground. Switch 164 is responsive to a differential input signal $V_{in}$ received at input port 122 and may couple current source 162 to node H1 or to node L1. Node H1 is coupled to output terminal 148 and node L1 is coupled to output terminal 146.

Switching stages SS2, SS3, SS4 and SS5 each similarly comprise a current source 166, 170, 174 or 178, respectively, and a switch 168, 172, 176 or 180, respectively. These current sources and switches are coupled together and coupled to ground and to output terminals 148 and 146 in the same manner as current source 162 and switch 164.

Delay stage D1 is coupled to input port 122 at nodes 182 and 184 and provides a delayed signal $V_{in-1}$ responsive to input signal $V_{in}$ at nodes 198 and 200. Switch 168 is coupled to nodes 198 and 200 and is responsive to signal $V_{in-1}$ and may connect current source 166 to terminals H2 or L2. Delay stages D2, D3 and D4 generate sequentially delayed signals $V_{in-2}$, $V_{in-3}$ and $V_{in-4}$ corresponding to $V_{in}$ and $V_{in-1}$. They are similarly coupled between switches 168 and 172, 172 and 176 and 176 and 180 respectively such that each subsequent switch 172, 176 or 180 receives a signal corresponding to differential input signal $V_{in-2}$, $V_{in-3}$, $V_{in-4}$ at a later time than the preceding switch.

As with the prior art cable driver 20, the improved cable driver 120 will typically be configured to produce a differential output signal $V_{out}$ at output terminals 146 and 148. The differential output terminal is defined as the difference between the voltage at output terminal 148 ($V_{148}$) and the voltage at output terminal 146 ($V_{146}$):

$$V_{out}=V_{148}-V_{146}$$

The improved cable driver operates as follows. A differential input signal $V_{in}$ is received at input terminals 158 and 160 and is directed to switch 164. As with the prior art cable driver 20, the differential input signal $V_{in}$ is defined as the difference between the voltage received at terminal 160 ($V_{160}$) and the voltage received at terminal 158 ($V_{158}$):

$$V_{in}=V_{160}-V_{158}.$$

Switch 164 is responsive to differential input signal $V_{in}$. If $V_{in}$ is high (i.e. $V_{160}>V_{158}$), switch 164 will couple current source 162 to node H1 and conversely, if $V_{in}$ is low (i.e. $V_{160}<V_{158}$), switch 164 will couple current source 162 to node L1.

Delay stage D1 provides a delayed signal $V_{in-1}$ corresponding to input signal $V_{in}$ at nodes 198 and 200. Switch 168 is responsive to signal $V_{in-1}$. If $V_{in-1}$ is high, switch 168 will couple current source 166 to node H2 and conversely, if $V_{in-1}$ is low, switch 168 will couple current source 166 to node L2. In this manner, current sources 162 and 166 will be coupled to the same output terminal 146 or 148.

Similarly switches 172, 176 and 180 are responsive to the delayed signals provided by delay stages D2, D3 and D4, respectively, and will couple current sources 170, 174 and 178, respectively, to the same output terminal 146 or 148 as current sources 162 and 166.

At steady state, if $V_{in}$ is low, all five current sources 162, 166, 170, 174 and 178 will be coupled to output terminal 148. The voltage at terminal 148 ($V_{148}$) will be $$V_{148}=V_{CC}-R_{128}(I_{162}+I_{166}+I_{170}+I_{174}+I_{178}).$$

The voltage at terminal 146 ($V_{146}$) will be $V_{CC}$, and the differential output signal $V_{out}$ will be $$V_{out} = V_{148} - V_{146}$$
$$= -R_{128}(I_{162} + I_{166} + I_{170} + I_{174} + I_{178})$$
$$= V_{OL}$$

If $V_{in}$ is high, all five current sources 162, 166, 170, 174 and 178 will be coupled to output terminal 146 and the output voltage will be $$V_{out} = R_{130}(I_{162} + I_{166} + I_{170} + I_{174} + I_{178})$$
$$= V_{OH}$$

Assuming that the differential input signal $V_{in}$ is initially high, differential output signal $V_{out}$ will be equal to $V_{OH}$. On the high to low transition of $V_{in}$, switch 164 will switch current source 162 from terminal H1 to L1. The voltage at terminal 146, will rise to $$V_{146}=V_{CC}-R_{130}(I_{166}+I_{170}+I_{174}+I_{178})$$

and the voltage at terminal 148 will fall to $$V_{148}=V_{CC}-R_{128}(I_{162}).$$

The differential output voltage $V_{out}$ will fall to $$V_{out} = V_{148} - V_{146}$$
$$= -R_{128}(I_{162}) + R_{130}(I_{166} + I_{170} + I_{174} + I_{178}).$$

Delay stage D1 will, after its configured delay period, produce a high to low transition at terminals 198 and 200.

Switch 168 will then switch current source $I_2$ from terminal H2 to terminal L2 and the differential output voltage will fall to $$V_{out} = -R_{128}(I_{162}+I_{166})+R_{130}(I_{170}+I_{174}+I_{178}).$$

This process will continue until the delay periods of all four delay stages D1, D2, D3 and D4 have elapsed, all five switches 164, 168, 172, 176 and 180 have respectively coupled 162, 166, 170, 174 and 178 to output terminal 146 and $V_{out}$ has fallen to $V_{OL}$, as defined above.

Figure 6A:
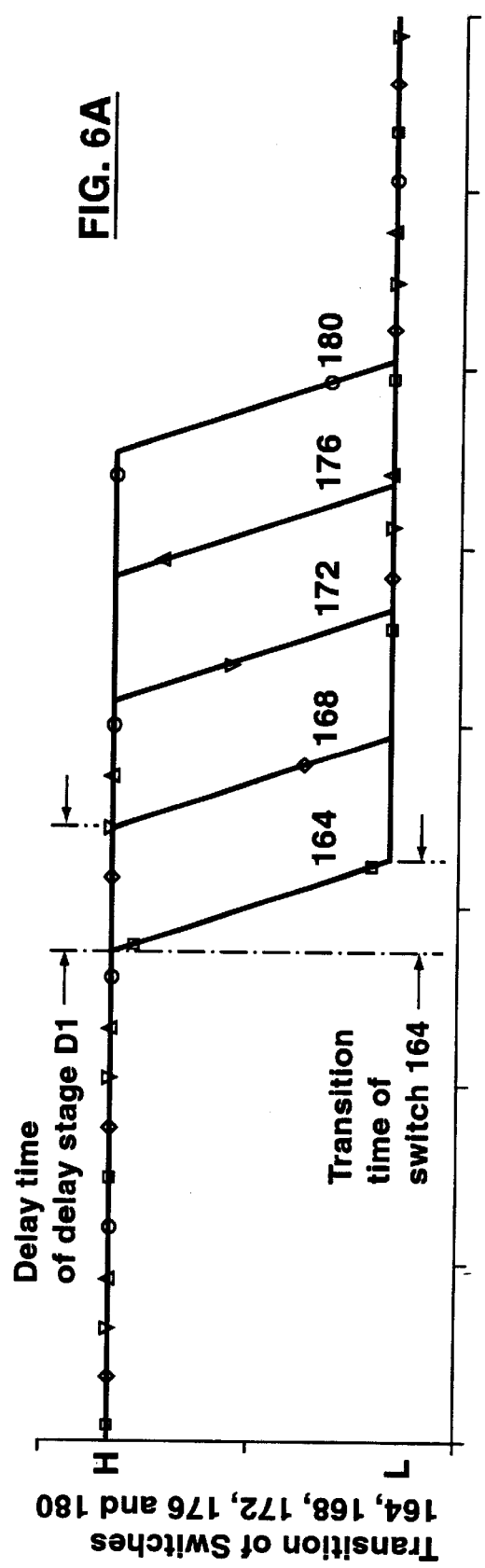
Figure 6B:
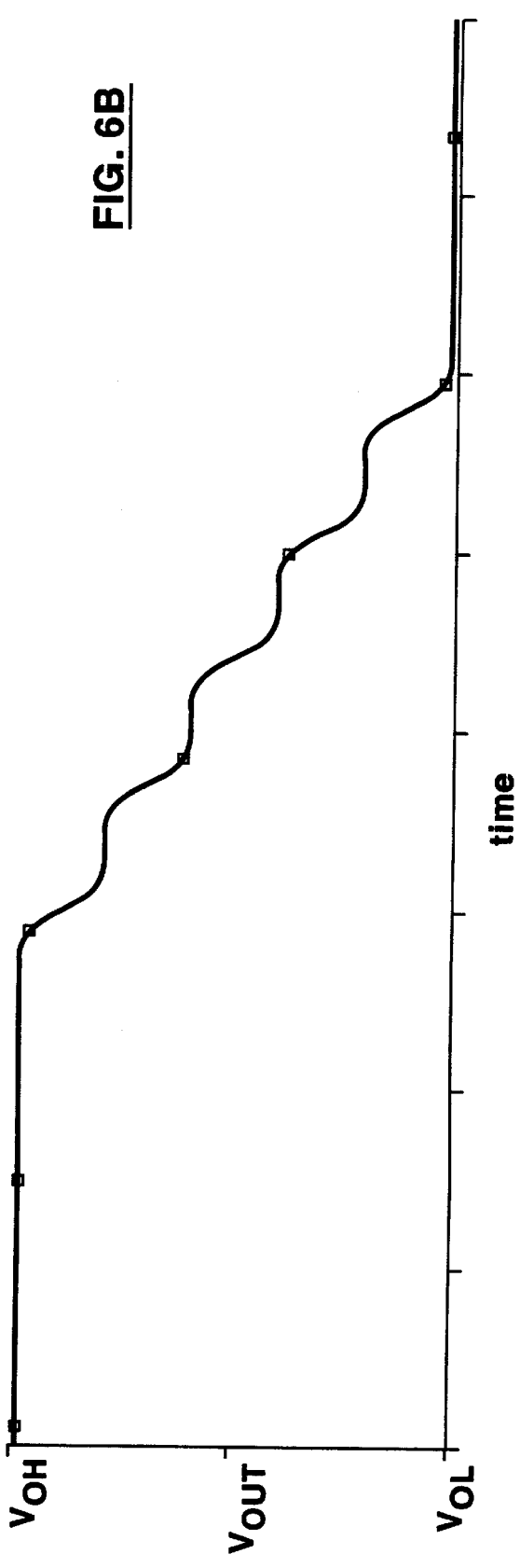

Reference is next made to FIGS. 6A and 6B. FIG. 6A shows the transitions of switches 164, 168, 172, 176 and 180 from their respective H nodes to their respective L nodes in response to a high to low transition of the differential input signal. FIG. 6B shows the corresponding high to low transition of $V_{out}$. Switches 164, 168, 172, 176 and 180 are non-ideal switches with a finite transition time. The transition time of switches 164, 168, 172, 176 and 180 and the delay times of delay stages D1, D2, D3 and D4 are preferentially chosen to ensure that the differential output signal $V_{out}$ is substantially linear. At the same time, the 20% to 80% rise and fall times of the differential output signal $V_{out}$ must exceed the specified minimum time. As shown in FIGS. 6A and 6B, if the transition time of the switching stages is too short, the output signal $V_{out}$ will appear as a staircase signal with each step being separated by the delay of the respective delay stages D1, D2, D3 and D4. Increasing the transition time of the switches 164, 168, 172, 176 and 180 will provide a smooth transition, improving the linearity of differential output signal $V_{out}$. As shown in FIGS. 7A and 7B, which also shows the transitions of switches 164, 168, 172, 176 and 180 and the differential output signal $V_{out}$, the differential output signal $V_{out}$ may be made substantially linear by making appropriate choices in the design of the switching stages SS1, SS2, SS3, SS4 and SS5 and delay stages D1, D2, D3 and D4. The design of these elements is described in detail below. As an example, a substantially linear differential output signal $V_{out}$ may be achieved if the delay time between the corresponding signals $V_{in}$, $V_{in-1}$, $V_{in-2}$, $V_{in-3}$ and $V_{in-4}$ is 70 ps and the transition time of the switches 164, 168, 172, 176 and 180 is 150 ps. This will provide a differential output signal with a transition time of approximately 220 ps.

When a low to high transition of $V_{in}$ occurs subsequently, switches 164, 168, 172, 176 and 180 will couple their respective current sources 162, 166, 170, 174 and 178 to output terminal 148 and differential output signal will return to its initial high output level $V_{OH}$.

Since the high to low and low to high transitions of the differential output signal $V_{out}$ are substantially linear, the ratio of the 20% to 80% rise time of $V_{out}$ to the 2% settling time (i.e. the 98% rise time) will be $$t_{20-80}/t_{98} = 0.6/0.98$$
$$= 0.612$$
$$= 61.2\%.$$

As described above, the 20% to 80% rise time or fall time of the differential output signal $V_{out}$ must exceed a minimum time period. If both the prior art cable driver 20 and the improved cable driver 120 are (1) configured to operate with this minimum 20% to 80% minimum rise/fall time and (2) receive an input which allows them the meet the requirement that the differential output signal $V_{out}$ must settle to with 2% of its steady state value (in order to reduce time jitter, as described above), the improved cable driver 120 will be capable of carrying a higher data rate than the prior art cable driver 20. The ratio of the maximum data rate which may be carried by the improved cable driver 120 to the maximum data rate which may be carried by the prior art cable driver 20 may be calculated as follows:

$$61.2\%/35.4\% = 1.73$$

Thus, the improved cable driver 120 is capable of carrying a data rate 1.73 times higher than the prior art cable driver 20, without increasing the generation of electromagnetic radiation or increasing jitter in the differential output signal $V_{out}$. One skilled in the art will recognize that if the particular application in which improved cable driver 120 requires that the jitter in the differential output signal $V_{out}$ be less than 1.46%, as calculated above, the benefit of the invention will be commensurately greater.

Figure 8:
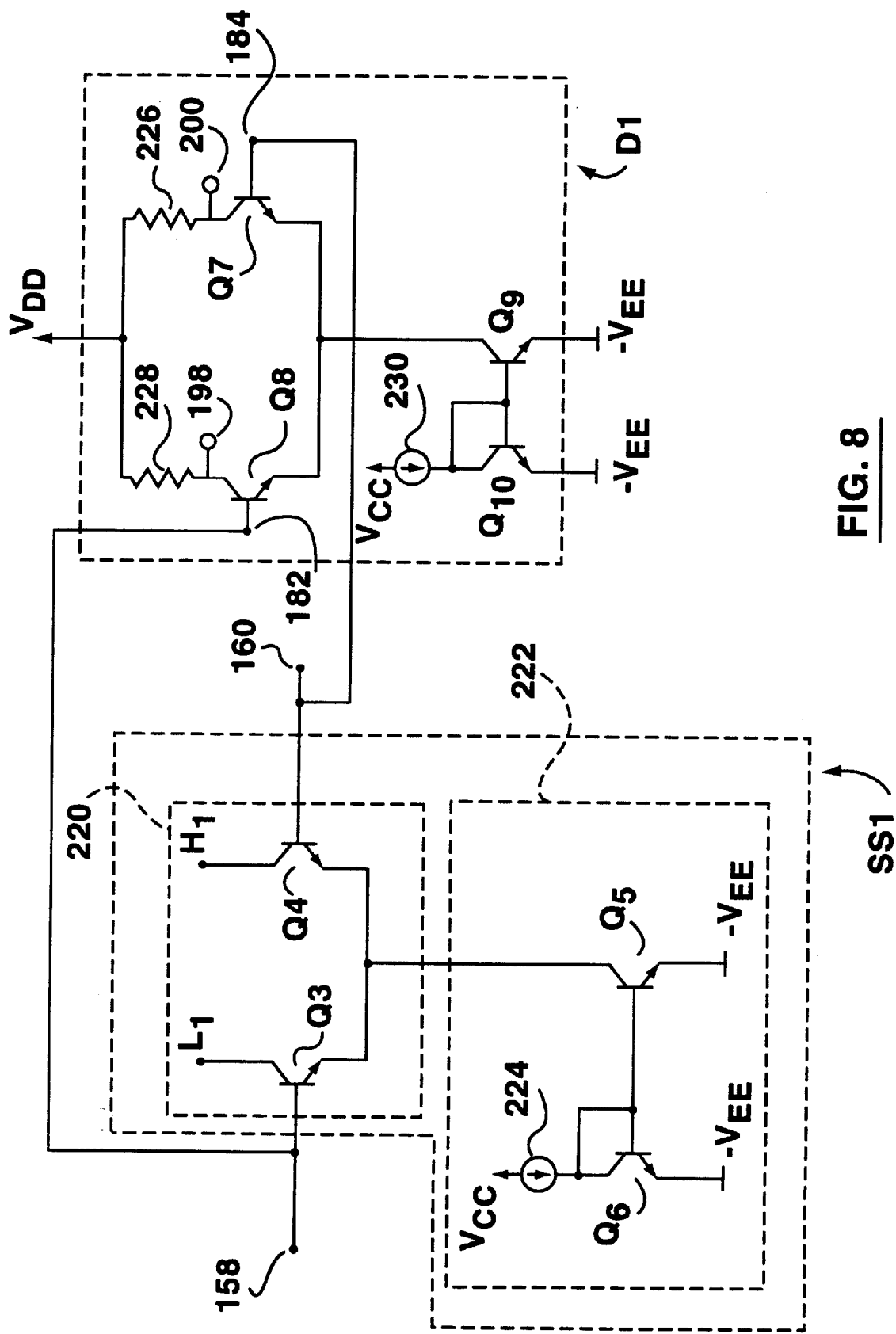
FIG. 8 shows the switching stage and delay stage of the improved cable driver.

Reference is next made to FIG. 8, which shows switching stage SS1 and delay stage D1 in detail. Switch 164 comprises a differential amplifier stage 220 and current source 162 comprises current mirror 222. Current mirror 222 comprises transistor Q5, diode connected transistor Q6 and reference current source 224, which are connected in the well known current mirror configuration. The bases of transistors Q5 and Q6 are coupled together and the emitters of transistors Q5 and Q6 are connected to a voltage source $-V_{EE}$. The collector of transistor Q6 is coupled to $V_{CC}$ through reference current source 224. The current drawn by transistor Q5 through differential amplifier stage 220 will depend on the current of current source 224 in known manner. Differential amplifier stage 220 comprises two transistors $Q_3$ and $Q_4$, the emitters of which are connected together. The base of transistor $Q_3$ is coupled to input terminal 158 and the base of transistor $Q_4$ is coupled to input terminal 160. The collector of transistor $Q_3$ comprises node L1 and the collector of transistor $Q_4$ comprises node H1. The emitters of transistors $Q_3$ and $Q_4$ are coupled to the collector of transistor $Q_5$.

The bases of transistors $Q_3$ and $Q_4$ are coupled to input terminals 158 and 160, respectively and receive the differential input signal across their bases. One skilled in the art will be familiar with the operation of the differential amplifier stage 220 and the current mirror 222 and will understand the switching operation provided by the switching stage SS1.

Delay stage D1 is comprised of a differential amplifier consisting of transistors Q7 and Q8, resistors 226 and 228 and a current mirror comprising transistors Q9, diode connected transistor Q10 and reference current source 230. The emitters of transistors Q7 and Q8 are connected together and to the collector of transistor Q9. The base of transistor Q9 is coupled the base of transistor Q10. The collector of transistor Q10 is coupled to $V_{CC}$ through reference current source 230. The emitters of the transistors Q9 and Q10 are connected to $-V_{EE}$. The collectors of transistors Q7 and Q8 are coupled to a voltage source $V_{DD}$ through resistors 226 and 228, respectively. Transistors Q7 and Q8 receive the differential input signal $V_{in}$ across their bases, which are connected to input terminals 160 and 158 respectively. The collectors of transistors Q7 and Q8 are coupled to nodes 200 and 198 respectively. One skilled in the art will understand that the operation of Q7 and Q8 as a differential amplifier will produce signal $V_{in-1}$ at nodes 198 and 200 (as discussed above) responsive to the differential input signal $V_{in}$, but delayed in time. The length of the delay will depend on the current of current source Q9, which will depend on the current of reference current source 230 in known manner, the resistance of resistors 226 and 228 and other characteristics of the bipolar technology in which the cable driver circuit is realized. One skilled in the art will be capable of selecting appropriate components to ensure that the transitions of the differential output signal are substantially linear.

Although the invention has been described with reference to an embodiment with 5 rise/fall time stages and 4 delay stages, the number of rise/fall time stages and delay stages may be varied to meet the operational requirements of the particular context in which the improved cable driver 120 is used. In addition, by varying the number and configuration of the switching stages and the delay stages, a non-linear differential output signal $V_{out}$ may be generated and in fact, any desired output wave form may be generated.

One skilled in the art will be capable of making the modifications necessary to use the improved cable driver 120 in these contexts and will recognize that these and other embodiments fall within the spirit and scope of the invention, as defined by the following claims.

What is claimed is:

1. A cable driver comprising:
   (a) an input port for receiving an input signal, comprising first and second input terminals;
   (b) an output port for transmitting an output signal on a transmission line, comprising first and second output terminals;
   (c) a first resistance and a second resistance for defining said output signal at said output port, said first resistance being coupled between a voltage source and said first output terminal and said second resistance being coupled between said voltage source and said second output terminal;
   (d) a plurality of switching stages, wherein each of said switching stages comprises a switch and a current source associated with said switch for producing a current, said current source being coupled to its associated switch for controlling the switching time of said associated switch and each of said switches being coupled to said output port, said plurality of switching stages including a first switching stage;
   (e) a plurality of delay stages for providing a delay time, wherein said first switching stage is coupled to said input port and the remaining switching stages are coupled in series, wherein one of said delay stages is coupled between each successive pair of said switching stages, such that each delay stage is coupled to a preceding switching stage and a succeeding switching stage, and wherein the delay time of each of said delay stages corresponds to the delay time of the other said delay stages, and wherein the current of each of said current sources corresponds to the current of the other said current sources and wherein the delay times and the currents are selected so that the rise and fall times of a first selected portion of said output signal exceeds a selected duration and a second selected portion of the output signal is substantially linear.

2. The cable driver of claim 1, wherein said first selected portion is the 20% to 80% rise or fall time of said output signal and wherein said first selection portion is chosen to reduce electro-magnetic interference.

3. The cable driver of claim 1 or 2, wherein said first and second resistances comprise resistors.

4. The cable driver of claim 1 or 2, wherein said first and second resistances have a resistance equal to each other and equal to the impedance of said transmission line.

5. The cable driver of claim 1 or 2 wherein the currents of said current sources are equal and wherein said delay times are equal.

6. The cable driver of claim 1 or 2 wherein said first selected portion is equal to said second selected portion.

7. The cable driver of claim 1 or 2 wherein each of said switches is a differential amplifier.

8. The cable driver of claim 7 wherein said differential amplifier includes first and second switching transistors, each of said first and second switching transistors having an emitter, a base input and a collector output, and wherein the emitters of each of said first and second switching transistors are coupled together.

9. The cable driver of claim 8 wherein the current source of each said switching stage is coupled to the emitters of said first and second switching transistors of the same switching stage, and wherein each of said current sources is a current mirror controlled by a common reference current source.

10. The cable driver of claim 8 wherein the collector output of each said first switching transistor is coupled to said first output terminal and the collector output of each said second switching transistor is coupled to said second output terminal.

11. The cable driver of claim 1 or 2 wherein each of said delay stages includes first and second delay transistors, each of said delay transistors having a collector output, a base input and an emitter and wherein the emitter of said first and second delay transistors are coupled together and to a current source.

12. The cable driver of claim 11 wherein the collector output of said first delay transistor is coupled to a voltage source through a first resistor and the collector output of said second delay transistor is coupled to a voltage source through a second resistor, and wherein the delay time of each said delay stage is regulated by selecting the resistance of said first and second resistors and the current of said current source.

13. The cable driver of claim 8, 9 or 10 wherein each of said delay stages includes first and second delay transistors, each of said delay transistors having a collector output, a base input and an emitter and wherein the emitter of said first and second delay transistors are coupled together and to a current source.

14. The cable driver of claim 13 wherein:
   (a) the base inputs of said first and second switching transistors of said first switching stage are coupled said first and second input terminals, respectively;
   (b) for each delay stage, the base inputs of said first and second delay transistors are coupled to said base inputs of said first and second switching transistors of said preceding switching stage;
   (c) for each delay stage the collector outputs of said first and second delay transistors are coupled to said base inputs of said first and second switching transistor of said succeeding switching stage.

* * * * *

UNITED STATES PATENT AND TRADEMARK OFFICE
CERTIFICATE OF CORRECTION

PATENT NO. : 6,288,592 B1
DATED : September 11, 2001
INVENTOR(S) : Gupta

It is certified that error appears in the above-identified patent and that said Letters Patent is hereby corrected as shown below:

Column 4,
Line 44, delete "of current".

Column 9,
Line 27, insert new paragraph before "Increasing".
Line 41, delete "150 ps", and insert -- 50 ps --.
Line 43, delete "220 ps", and insert -- 150 ps --.

Column 11,
Line 2, delete "of the bipolar technology in which the cable driver circuit is realized", and insert -- of the cable driver circuit and its package. --.

Signed and Sealed this

Eighth Day of October, 2002

Attest:

Attesting Officer

JAMES E. ROGAN
Director of the United States Patent and Trademark Office